United States Patent
Knox

(10) Patent No.: US 8,152,886 B2
(45) Date of Patent: Apr. 10, 2012

(54) FILTER ARRANGEMENT

(75) Inventor: Ron Knox, Victoria (AU)

(73) Assignee: Xtralis Technologies Ltd., Nassau (BM)

( * ) Notice: Subject to any disclaimer, the term of this patent is extended or adjusted under 35 U.S.C. 154(b) by 110 days.

(21) Appl. No.: 12/516,178

(22) PCT Filed: Nov. 23, 2007

(86) PCT No.: PCT/AU2007/001805
§ 371 (c)(1),
(2), (4) Date: May 22, 2009

(87) PCT Pub. No.: WO2008/061317
PCT Pub. Date: May 29, 2008

(65) Prior Publication Data
US 2010/0050879 A1 Mar. 4, 2010

(30) Foreign Application Priority Data

Nov. 24, 2006 (AU) .............................. 2006906591

(51) Int. Cl.
*B01D 50/00* (2006.01)
(52) U.S. Cl. ............. 55/484; 55/482; 55/385.1; 55/486; 55/487; 55/525; 55/498; 55/499; 55/501; 96/413; 73/31.07; 73/863.23
(58) Field of Classification Search .................... 55/484, 55/482, 385.1, 486, 487, 525, 498, 499, 501; 73/31.07, 863.23; 96/413
See application file for complete search history.

(56) References Cited

U.S. PATENT DOCUMENTS

| | | | |
|---|---|---|---|
| 3,880,626 A | 4/1975 | Griwatz et al. | |
| 4,026,758 A | 5/1977 | Sato | |
| 4,383,918 A | 5/1983 | Chupka et al. | |
| 4,649,996 A | 3/1987 | Kojicic et al. | |
| 4,661,255 A * | 4/1987 | Aumann et al. | 210/491 |
| 4,732,675 A * | 3/1988 | Badolato et al. | 210/314 |
| 4,950,313 A | 8/1990 | Dullien et al. | |
| 5,108,474 A * | 4/1992 | Riedy et al. | 55/485 |
| 5,610,592 A | 3/1997 | Okazaki | |
| 5,854,431 A * | 12/1998 | Linker et al. | 73/863.23 |

(Continued)

FOREIGN PATENT DOCUMENTS

CN 2425697 Y 3/2001

(Continued)

OTHER PUBLICATIONS

"European Application No. EP 07 81 5607, Supplementary European Search Report mailed Apr. 16, 2010", 1 pg.

(Continued)

*Primary Examiner* — Jason M Greene
*Assistant Examiner* — Dung H Bui
(74) *Attorney, Agent, or Firm* — Schwegman, Lundberg & Woessner, P.A.

(57) ABSTRACT

A filter arrangement for removing impurities from a fluid is disclosed, the filter arrangement (10) includes a plurality of screen portions (18, 20) through which the fluid passes. The screen portions include a first screen portion (18) and a second screen portion (20) separated by a predetermined distance. The predetermined distance can be determined on the basis of a threshold particle length. In one form the filter arrangement (10) is mounted in a housing (16) which is configured to receive two filter elements (18, 20) arranged in a nested configuration. A particle detector using the filter is described.

52 Claims, 9 Drawing Sheets

U.S. PATENT DOCUMENTS

| | | | |
|---|---|---|---|
| 5,968,373 A * | 10/1999 | Choi | 210/806 |
| 6,029,479 A | 2/2000 | Patee | |
| 6,336,948 B1 * | 1/2002 | Inoue et al. | 55/486 |
| 6,773,477 B2 * | 8/2004 | Lindsay | 55/385.3 |
| RE38,797 E * | 9/2005 | Linker et al. | 73/863.12 |
| 7,075,646 B2 | 7/2006 | Cole | |
| 7,118,608 B2 * | 10/2006 | Lovell | 55/385.1 |
| 7,129,847 B2 | 10/2006 | Right et al. | |
| 7,398,887 B2 * | 7/2008 | Choi | 210/491 |
| 7,459,002 B2 * | 12/2008 | Kalous et al. | 55/385.1 |
| 7,582,131 B2 * | 9/2009 | Worthington et al. | 55/501 |
| 2004/0104159 A1 | 6/2004 | Benavides et al. | |
| 2005/0030172 A1 | 2/2005 | Right et al. | |
| 2005/0055990 A1 * | 3/2005 | Choi et al. | 55/487 |
| 2007/0277626 A1 * | 12/2007 | Saitoh et al. | 73/863.23 |
| 2009/0188222 A1 * | 7/2009 | Evans et al. | 55/477 |
| 2009/0249895 A1 * | 10/2009 | Mahler | 73/863.23 |
| 2009/0293646 A1 * | 12/2009 | Johnson et al. | 73/863.22 |

FOREIGN PATENT DOCUMENTS

| | | |
|---|---|---|
| CN | 1603835 A | 4/2005 |
| GB | 1235322 | 6/1971 |
| JP | 43-029415 Y1 | 12/1968 |
| JP | 50-139466 A | 11/1975 |
| JP | 4152992 A | 5/1992 |
| JP | 6-063329 A | 3/1994 |
| JP | 7-145719 A | 6/1995 |
| JP | 2005-052833 A | 3/2005 |
| JP | 2006-144689 A | 6/2006 |

OTHER PUBLICATIONS

"International Application Serial No. PCT/AU207/0001805, International Search Report and Written Opinion mailed Jan. 16, 2008", 10 pgs.

"Japanese Application Serial No. 2009-537451, Office Action mailed Dec. 6, 2011", (w/English Translation), 7 pgs.

* cited by examiner

FILTER ARRANGEMENT

FIELD OF THE INVENTION

The present invention relates to a filter arrangement for use in removing particles entrained in a fluid flow and a particle detector using such a filter. The preferred embodiment will be described in connection with the removal of elongate particles from a sample flow prior to the analysis of the sample flow by a smoke detector. However, the present invention should not be considered as being limited to that exemplary application.

BACKGROUND OF THE INVENTION

In optical particle detectors, the presence of particles is detected in an air sample by monitoring the extent of scattering from a beam of electromagnetic (EM) radiation traversing the sample. From time to time undesired impurities, such as dust, lint or insects may enter the detection chamber in which detection takes place. If such impurities impinge upon the beam of EM radiation they will typically cause a great deal of scattering within the detection chamber and may cause a "false positive" detection event. This is particularly the case if the unwanted impurities enter the portion of the beam that is visible to the EM detector which is typically called the "region of interest".

In order to guard against the entry of undesired impurities into the detection chamber many particle detectors are provided with filters in the flow path to filter the sample prior to it entering the detection chamber.

One method of filtering the inlet of a smoke detection system, which is used primarily in aspirating smoke detectors is filtration using "bulk" filters, such as foam, paper or the like. Such filters are effective at removing both large particle dust particles and elongate particles like lint, but suffer from a tendency to also remove the smoke particles that are intended to be detected.

The removal of the wanted particles (i.e. smoke) from the air-flow by bulk filters becomes increasingly severe as the filter material becomes clogged. However, this clogging has been discovered to have proportionally less severe effect on the air-flow through the system, than it does on the removal of smoke particles passing from the air-flow. The consequential effect on pressure drop across the filter is therefore relatively small. Moreover, such filters are generally designed to contribute only a small fraction of the pressure drop of the whole system meaning that the effect of its clogging upon flow rate cannot be relied upon to signal an unacceptable loss of sensitivity.

An alternative to the use of a bulk filter is to use a mesh screen that is placed across the inlet to the detector. Such screens are effective at preventing particles with all dimensions greater than the hole size of the mesh screen from entering the detection chamber. However, smaller particles still get through. Elongate particles also pose a problem for mesh screen filters, because, although they may be much longer than hole size of the mesh screen, the particles may have sufficiently small cross section to pass through the screen if they are aligned with it.

Moreover, some elongate particles, which are initially stopped by a mesh screen, will work their way through the screen by changing orientation with respect to the screen to thereby "wiggle" their way through it. In the past it has been identified that finding a mechanical solution to this problem was not possible and that a software-based solution was thought to be required.

A range of techniques enable a smoke detector to tolerate the effects of dust particles without the use of a filter are known, however elongate particles can still pose a problem as they may become lodged within the detection area of the smoke detector and trigger a substantially permanent false smoke detection response.

In practice some elongate particles will move through the region of interest relatively quickly, and cause transient false positive readings. Typically such events can be handled using suitable algorithms in the detector software. However, a permanent false alarm may be caused by particles that become lodged in, or adhere to, the inside of the detector in a position that causes them to remain in the region of interest. The length of particle that can induce such a false alarm is dependent upon the internal architecture of the particular smoke detector. In this, regard, only particles that are long enough to extend from a surface, on which it may adhere, to the region of interest will pose a threat to the detector. Shorter elongate particles will not extend into the region of interest and thus do not pose a threat in this manner.

It is to be understood that the discussion of prior art herein does not constitute an admission that that prior art, or the conclusions drawn from it by the inventor, form part of the common general knowledge of a person skilled in the art at the priority date of the application.

SUMMARY OF THE INVENTION

In a first aspect of the present invention there is provided a filter arrangement for removing impurities from a fluid, the filter arrangement including a plurality of screen portions through which the fluid passes, wherein the plurality of screen portions includes a first screen portion and a second screen portion separated from the first screen portion by a predetermined distance.

The predetermined distance is preferably determined on the basis of a threshold particle length to be removed from the fluid.

In a preferred embodiment the filter arrangement is adapted for removing impurities from a fluid to be processed by a particle detector. In this case it is preferable that the first screen portion and the second screen portion are separated by a distance not more than a critical particle length of the particle detector.

Preferably the separation between screen portions is less than 90% of the critical particle length of the detector. The separation between screen portions can be between 80% and 50% of the critical particle length of the detector. Other separations may also work.

In an embodiment the preferred threshold particle length may be between 0.25 mm and 10 mm.

In certain implementations the separation between the first screen portion and the second screen portion of the filter arrangement is optimised for operation at a fluid-flow flow rate of less than about 150 liters per minute.

In a second aspect of the present invention there is provided a filter arrangement for removing particles from a fluid, the filter element having a plurality of overlying screen portions configured to be traversed in series by the fluid, and wherein a first screen portion of the plurality of screen portions, is spaced apart from a subsequently traversed screen portion by a spacer means.

In a third aspect of the present invention there is provided a filter arrangement for removing elongate particles from a fluid, the filter element having a plurality of screen portions configured to be traversed in series by the fluid, and wherein a downstream screen portion is positioned within a particle misalignment zone of an upstream screen portion in which particles passing through the upstream screen portion are caused to be misaligned with the direction of fluid flow by the upstream screen portion.

In the previous aspects the screen portions can be different screens, arranged to be traversed by the fluid sequentially. Preferably the first and second screen portions are substantially parallel. The screen portions can be formed from a mesh material.

In certain embodiments the filter arrangement includes: a housing having at least one wall defining a chamber therein, said housing also having at least one inlet aperture through which fluid enters the chamber and at least one outlet aperture through which fluid exits the chamber; a plurality of filter elements displaced within the chamber, each filter element including at least one screen portion traversing the flow path from the inlet of the chamber to the outlet of the chamber.

The filter elements can be a range of shapes, including, a basket-like shape. In an embodiment with basket-like filter elements the, the first basket-like filter element can be configured to be received in a nested configuration within the second basket-like filter element.

The first and second screen portions can be formed of mesh material having substantially the same hole size. They can alternatively be formed of mesh material having different hole sizes.

The filter arrangement can include spacer means positioned between overlying screen portions. The spacer means can be configured to maintain at least a predetermined separation between overlying screen portions. The spacer means can include a screen. The spacer means can include a mesh having a thickness equal to the predetermined separation between the overlying screen portions. The spacer means can include one or more moulded elements.

In one preferred form the screen portions can be cylindrical in shape and arranged substantially concentrically with one another.

In a fourth aspect of the present invention there is provided a filter arrangement for removing impurities from a fluid, the filter arrangement including a plurality of screen portions through which the fluid passes, wherein the plurality of screen portions includes a first screen portion having a screen interaction region and a second screen portion separated from the first screen portion and positioned in the screen interaction region of the first screen portion.

In a fifth aspect of the present invention there is provided a particle detector including a filter arrangement according to an embodiment of an aspect of the present invention. The particle detector is preferably a smoke detector.

In another aspect of the present invention there is provided a particle detector for detecting particles in a fluid sample, the particle detector including: an inlet configured to receive a fluid sample, a housing including at least one wall defining a sample chamber in fluid communication with the inlet, the sample chamber being configured to receive at least part of the fluid sample; particle detection means arranged to measure particles in a region of interest within the sample chamber, a filter arrangement for removing impurities from the sample fluid entering the inlet, said filter arrangement including a plurality of screen portions through which the fluid passes, wherein the plurality of screen portions includes a first screen portion and a second screen portion separated from the first screen portion by a predetermined distance.

The predetermined distance is determined on the basis of a threshold particle length to be removed from the fluid.

The threshold particle length is preferably equal to the minimum distance between a wall defining at least part of the sample chamber and a region of interest of the particle detection means. The separation between screen portions is preferably less than the threshold particle length.

In another aspect of the present invention there is provided a particle detection system including a particle detector for detecting the presence of particles in a fluid flow and a filter arrangement adapted to filter at least part of the fluid flow prior to the detection of particles by the particle detector, wherein the filter arrangement is a filter arrangement made in accordance with an embodiment of one of the aspects of the present invention.

BRIEF DESCRIPTION OF THE DRAWINGS

A preferred embodiment will now be described by way of non-limiting example only with reference to the accompanying drawings, in which.

DETAILED DESCRIPTION OF THE EMBODIMENTS

The inventor has determined that by placing a plurality of screen portions in a fluid-flow, which are separated from each other by a relatively short distance, a surprising increase in the effectiveness in capturing elongate particles can be achieved.

It is expected that the first screen portion will capture all particles having all dimensions larger than its hole size and also a proportion of those elongate particles which have a cross section smaller than the hole size in the screen. However, the inventor has found that for some particle types, if at least one additional screen is placed downstream of the first screen in a suitable position, the proportion of particles captured in the plurality of screens is greater than would be expected, given the particle size distribution exiting the first screen (and any subsequent screens).

The inventor hypothesizes that the improved filtration provided by the second screen is a result of either one or more of the following effects:

1. Particles that are longer than the separation between neighbouring screen portions will typically contact both screens simultaneously, and thus need to work their way through two layers of screen simultaneously if they are to pass through the filter arrangement. However, by contacting both screens at once the freedom of movement of the particles is reduced, consequently reducing their ability to wiggle through both screens.

2. Elongate particles that pass through the first screen will generally be aligned with the direction of fluid flow by the screen. In this case, the inventor hypothesizes that an upstream screen portion of the filter arrangement will cause a zone of turbulent flow downstream of it which may cause elongate particles having a length shorter than the separation between screens to rotate out of this initial alignment. If the second screen portion is placed within this turbulent zone or shortly thereafter that the particle capturing efficiency of the second screen portion may be increased as the elongated particles are less likely to be aligned with the holes in the downstream screen portion.

In the specification and claims the term "screen interaction region" is used to refer to the region downstream of a first screen portion, in which a second screen portion may be placed, and in which the second screen portion exhibits improved screening performance of elongate particles compared to the performance the second screen portion would have if the first screen portion was not present and the second screen portion was exposed to the same particle size distribution at the same fluid flow rate. It should be noted that the relevant particle size distribution is the particle size distribution remaining in the fluid flow after passing through the first screen portion. Screen portions can also act together to capture a particle of a given length by being placed with a separation less than or equal the particle's length.

Figure 1A:
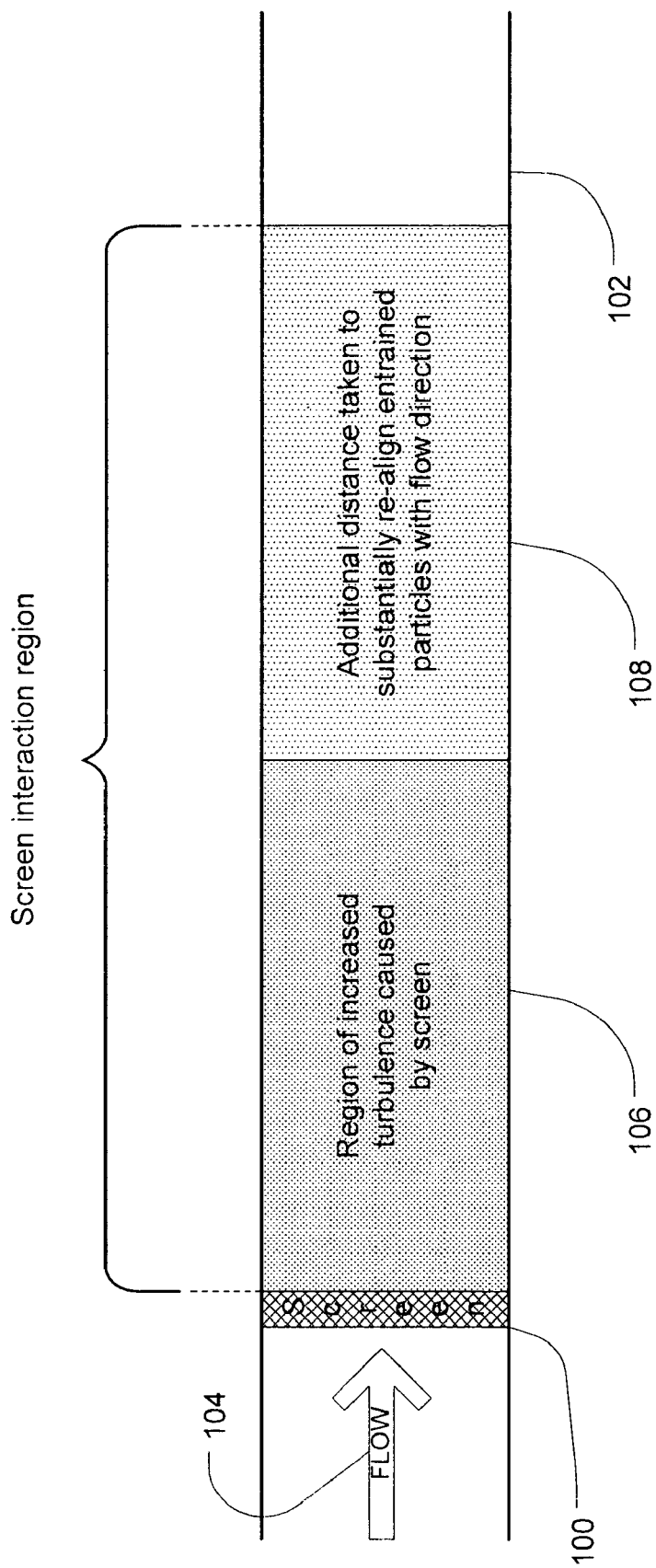
FIG. 1A shows a fluid flow with a screen portion extending across it that depicts a screen interaction region of the screen portion.

FIG. 1A illustrates an exemplary screen interaction region of a screen 100 placed in chamber 102 in which a fluid is flowing in the direction indicated by arrow 104. Immediately following the screen 100 there is a region 106 of more turbulent flow created by the presence of the screen 100. Since elongate particles tend to align with the direction of fluid flow when passing through a screen, the increased turbulence in region 106 may cause the particles to rotate. In some instances the particles may not realign with the direction of fluid flow for an extended period as indicated by region 108 The screen interaction region is the combination of these two regions.

In the specification and claims the "critical particle length" for a detector is the minimum length of particle that may impinge upon the region of interest of a particle detector whilst adhering to a portion of the detector. In some cases (e.g. aspirated particle detectors with a defined direction of fluid flow) it will be sufficient to only consider surfaces "upstream" from the region of interest of the particle detector when considering the critical particle length of a detector.

Figure 1B:
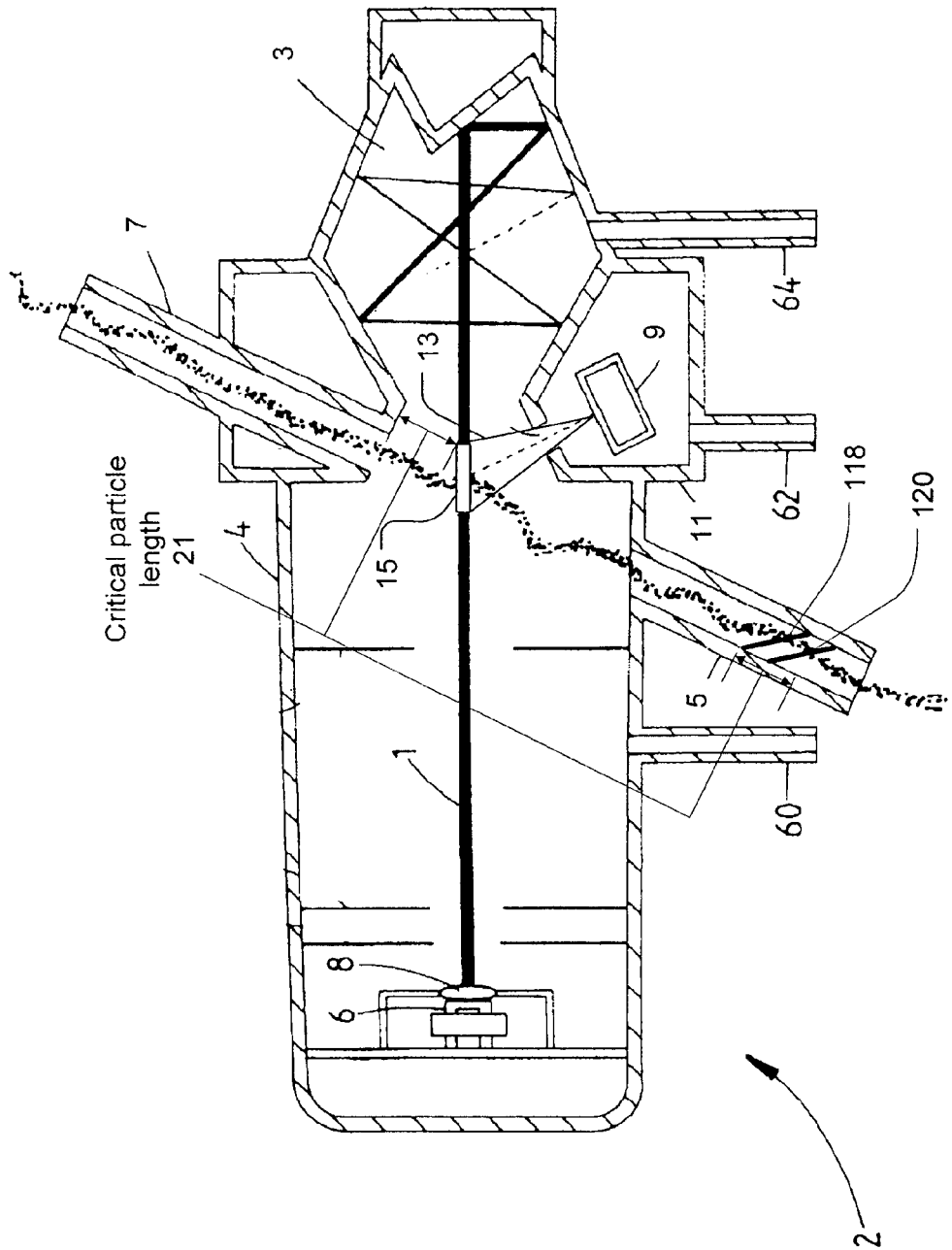
FIG. 1B shows a particle detector able to be used with a filter element of an embodiment of the present invention.

FIG. 1B illustrates a smoke detector 2 and is used to illustrate the concept of a critical particle length of a smoke detector. The smoke detector 2 is of optical scattering type and includes a detector chamber 4 of tubular form having at one end a light source 6 and lens 8 to produce a focused beam 1 traversing the chamber 4. The light source 6 in the detector of the illustrated is a laser although other forms of light source may alternatively be used. The light beam 1 is directed into a light absorber 3 at the other end of the chamber 4. An inlet 5 and outlet 7 are provided to direct fluid-flow obliquely across the chamber 4 through the path of the beam 1 at a position adjacent the light absorber 3. A photo detector 9 for receiving scattered light is mounted within an enclosure 11 adjacent the absorber 3. The photo detector 9 can receive light scattered from the light beam within a viewing angle 13. Thus, if a particle that enters the portion of the light beam viewed by the photo detector 9, i.e. the region of interest 15, it will scatter light strongly into the photo detector 9.

As noted above, it is possible for an elongate particle, of a sufficient length to become attached to an inside wall of detector 2 in a position so that it is permanently in (or repeatedly enters). the region of interest 15, thereby causing a false alarm. The minimum length of a particle that can cause such a problem, the critical particle length, is determined by the minimum distance between the region of interest and the inside wall of the detector chamber. In this example, the shortest distance between the region of interest and the inside wall of the detector chamber is indicated by reference numeral 21, and defines the critical particle length of the detector.

In order to remove elongate particles from the fluid flow entering the chamber 4 of the detector 2, its inlet 5 is provided with two filter elements 118 and 112. These are set in a parallel orientation with a separation, measured in the direction of fluid flow, that is less then the critical particle length 21 of the detector 2. They are advantageously placed at an angle to the axis of the inlet 5 to provide a relatively large surface area (when compared to screens placed perpendicular to the fluid flow).

In some applications it would be desirable to remove all elongate particles longer than (or equal to) the critical particle length. However in other circumstances it may not be essential to filter all such particles. For example, in some situations the expected particle distribution may include very few particles longer than the critical particle length but shorter than some threshold length. In these circumstances acceptable reliability may still be achieved without attempting to filter particles less than this threshold length.

Figure 2:
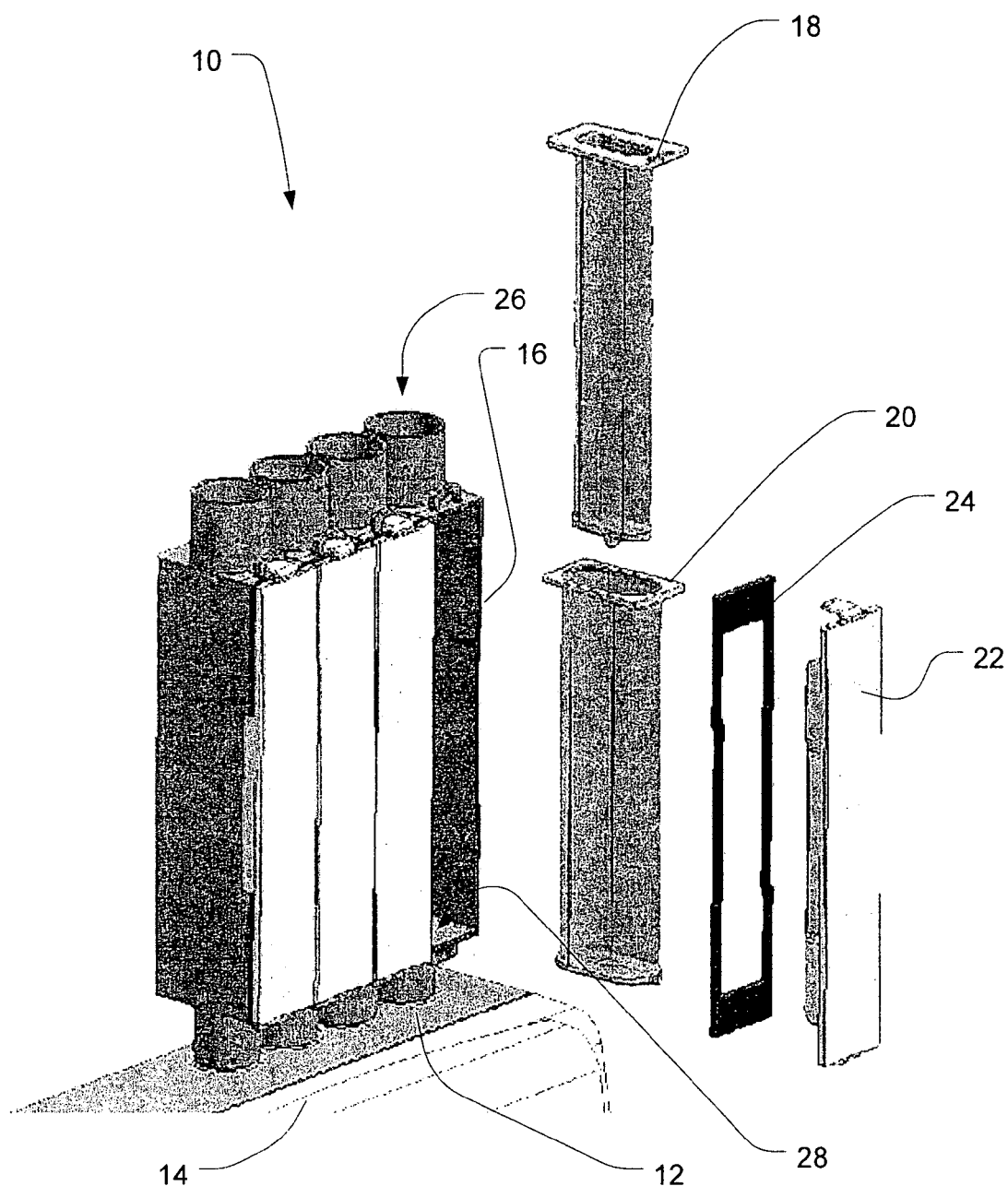
FIG. 2 is an exploded view of a filter arrangement in accordance with a first embodiment of the present invention.

FIG. 2 shows an exploded view of a filter arrangement 10 coupled to an input port of a particle detection apparatus 14 to form a particle detection system. In the present example, the particle detection apparatus may be an aspirated smoke detector such as those marketed under the trade mark VESDA® by Xtralis Pty Limited. The filter arrangement 10 is mounted in the flow path between a sampling pipe network (not shown) and the input port 12 of the smoke detector 14. The filter arrangement 10 comprises a housing 16 which is configured to receive two filter elements 18, 20. The housing is closed by a cover 22, and sealed against leakage by a seal 24 between the cover 22 and the housing 16. In use, the filter elements 18 and 20 are arranged in a nested configuration with the filter element 18 located inside filter element 20. The filter elements 18 and 20 are shaped such that the filtering screens of the first filter element 18 and the second filter element 20 are maintained at a predetermined separation from each other over substantially their entire surface areas.

In use, fluid-flow from the sampling network enters the filter housing 16 by an inlet port 26 and passes sequentially through the filtering screen of the first filter element 18 then through the filtering screen of the second filter element 20 before passing through an outlet port 28 of the filter housing 16 and into the inlet port 12 of the smoke detector 14.

Figure 3:
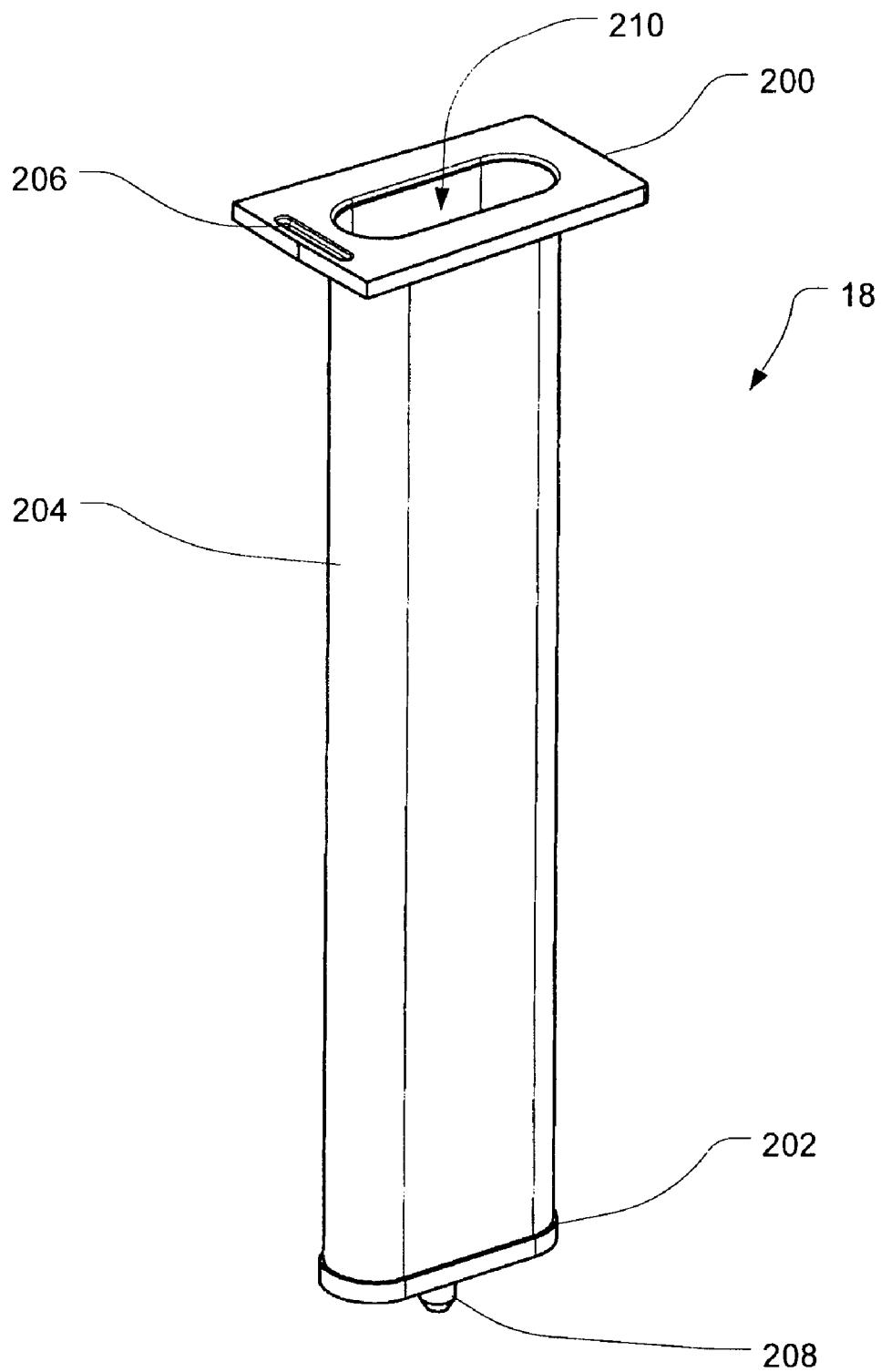
FIG. 3 illustrates a first filter element applicable to an embodiment of the present invention.

FIG. 3 shows a perspective view of the inner filter element 18 depicted in FIG. 2. The filter element comprises a top plate 200 and a bottom plate 202 and extending therebetween is a tubular web of filter medium 204. The top plate 200 has an aperture 210 formed in it to allow air to enter the filter element 18. In a preferred embodiment the filter medium 204 is a stainless steel mesh. The top plate 200 of the filter element 18 is shaped in such a way that it is received into the housing 16 of the filter arrangement 10, and may also be provided with a grab 206 to facilitate removal of the filter basket 18 from the housing 16. On the lower plate 202 there is formed a locater pin 208 which is used to align the filter basket 18 with second filter basket 20 to maintain separation between the filter element 204 of the inner basket 18 and the filter element 304 of the outer basket 20 (shown in FIG. 4).

Figure 4:
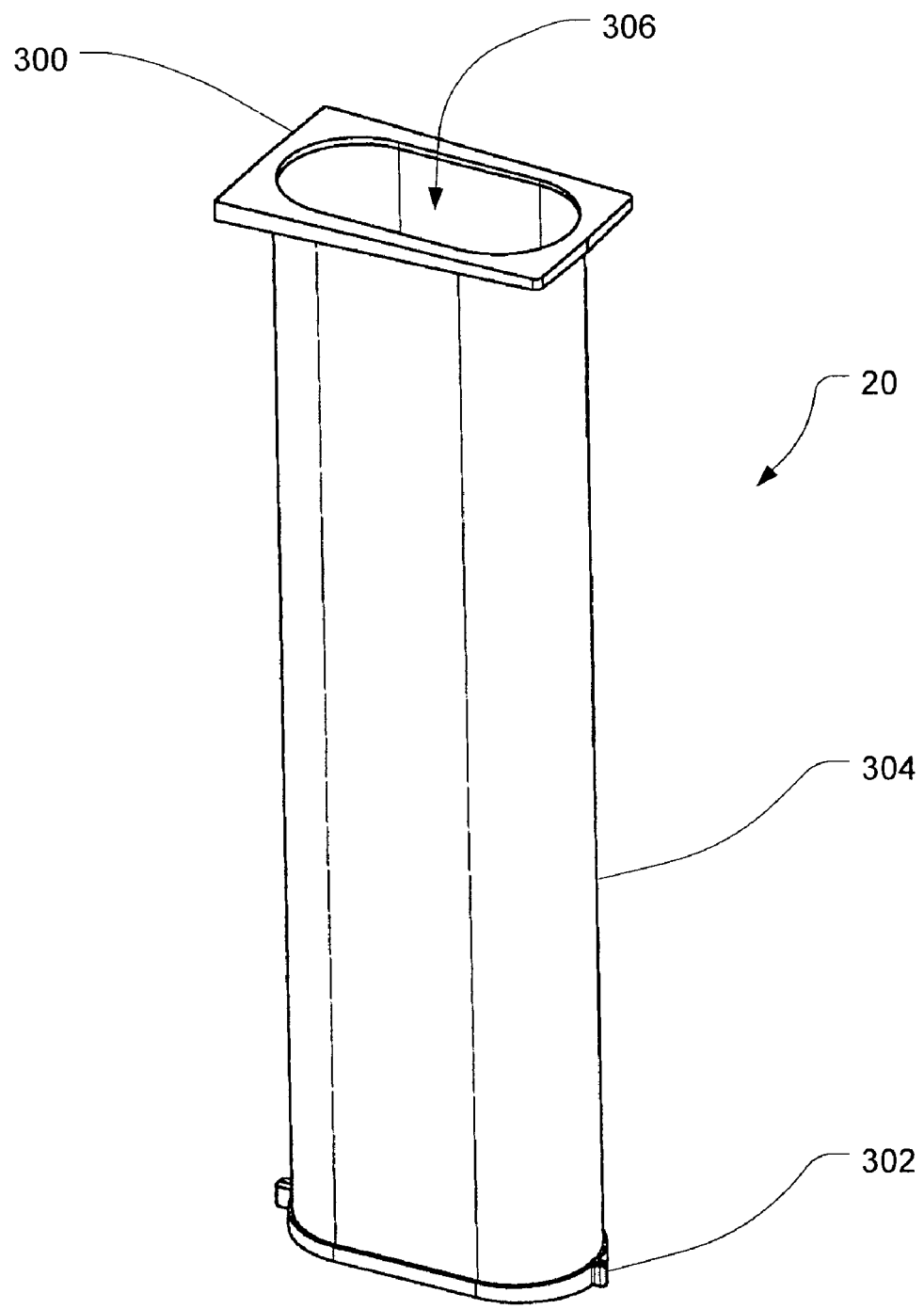
FIG. 4 illustrates a second filter element usable in an embodiment of present invention.

FIG. 4 shows the outer filter basket 20 used in the preferred embodiment. The filter element 20 is similar in overall construction to the inner filter basket 18 and includes a top plate 300 and bottom plate 302 with a tubular web of filtering element 304 extending therebetween. The upper plate 300 has an aperture 306 defined in it that is sized so as to enable the inner filtering element 18 to be inserted into it. Although not shown in this representation the bottom plate 302 is provided with a recess (or other locating arrangement) that receives the locating pin 208 of the inner basket to align the inner and outer filtering baskets (18 and 20) such that a substantially uniform separation is maintained between the filtering elements 204 and 304 of the baskets 18 and 20.

Figure 5:
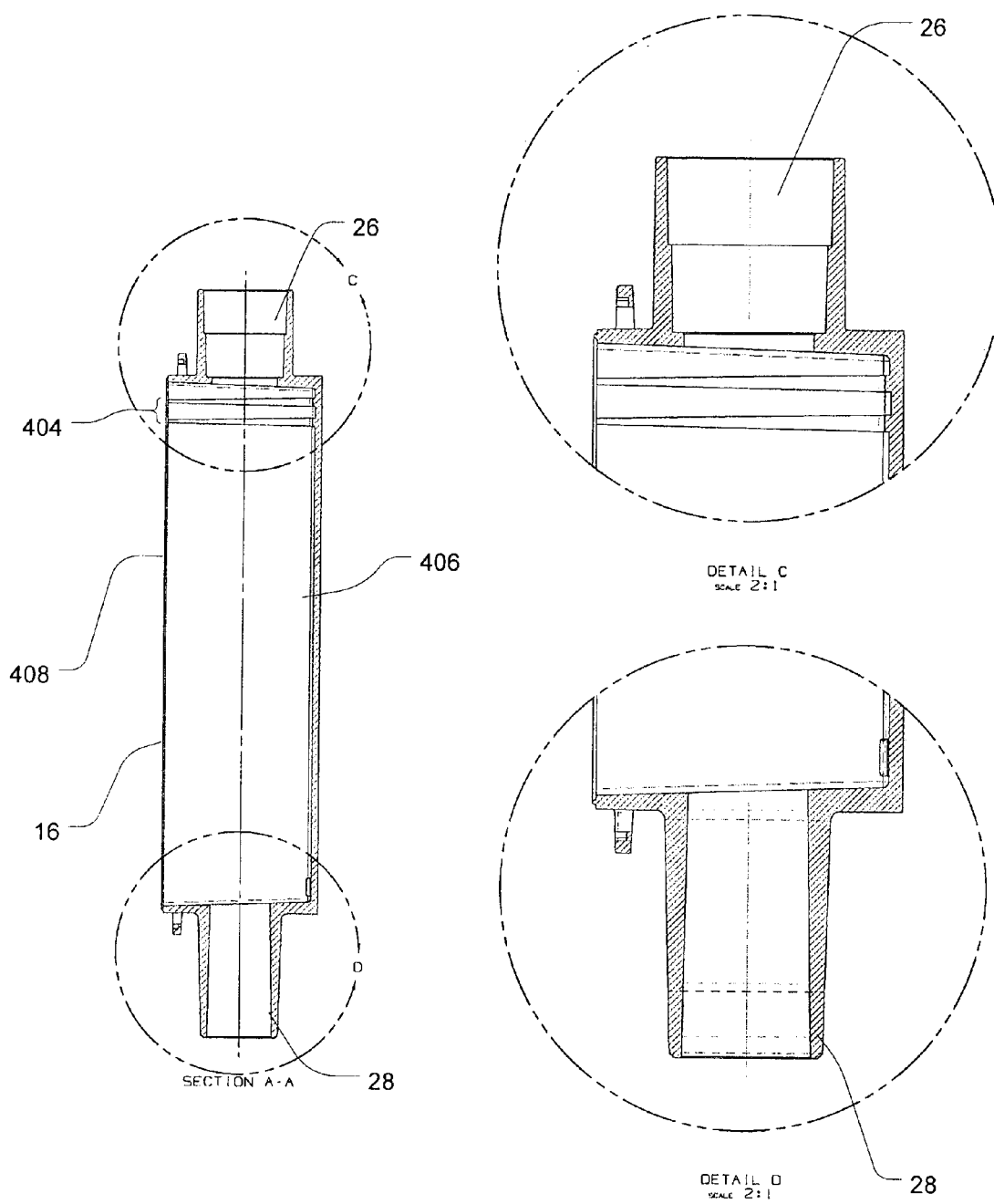
FIG. 5 shows a cross-sectional view of a filter housing in an embodiment of the present invention.

FIG. 5 shows a cross-sectional view through the housing 16 of the filter arrangement 10 of the preferred embodiment. The housing 16 provides a box-like enclosure into which two filter elements 18 and 20 are inserted. The housing 16 is provided with an inlet port 26 and an outlet port 28. The inlet port 26 has a stepped bore which is sized to sealingly engage an inlet pipe. The outlet port 28 is provided with a tapered wall to enable it to be sealingly inserted into an inlet port of a smoke detection device or pipe. The inside walls of the housing 16 are provided with a guide arrangement 404 which is configured to receive the upper plates 200, 300 of the filter baskets 18 and 20 to hold them in place within the housing chamber 406. An open side of the housing 408 is configured to be closed with cover 22 and sealed with seal 24.

Figure 6:
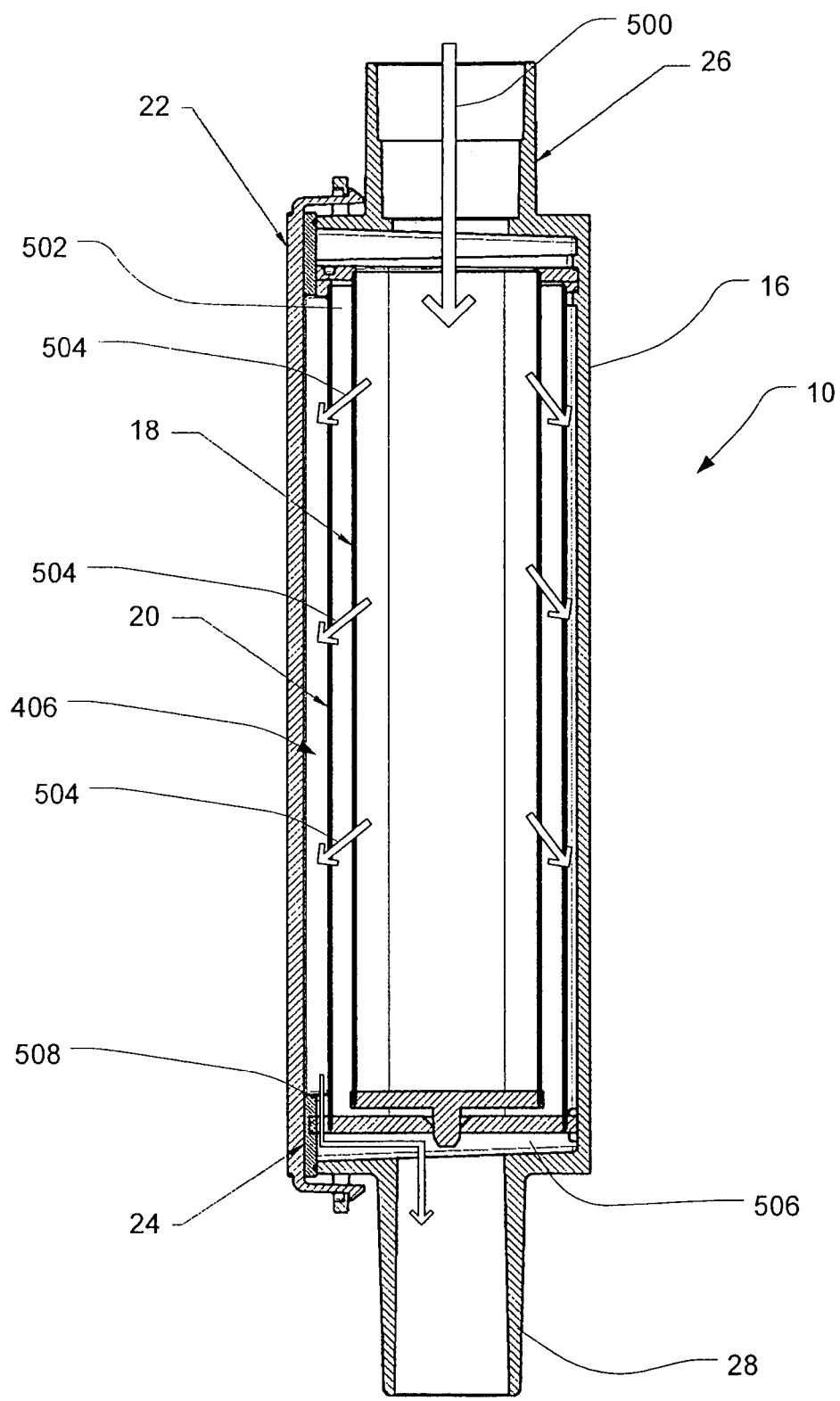
FIG. 6 is a cross-sectional view through an assembled filter arrangement according to the embodiment of the present invention.

FIG. 6 is cross-sectional view of the filter arrangement 10 in assembled form. As can be seen filter basket 18 is nested within the outer filter basket 20 which are both placed within the void 406 defined by the housing 16. The housing is closed with a cover 22 and sealed with a seal 24.

In use, the fluid-flow with entrained particles enters the inlet port 26 of the housing 16 in the direction of arrow 500 and proceeds into the internal cavity of the inner filtering element 18. It then passes through the filter material of the inner filtering basket 18 through a space 502 between the inner 18 and outer filtering baskets 20 and then through the filtering material of the outer filtering basket 20 as indicated by arrows 504. The filtered fluid-flow then passes around the outside of the outer filtering basket as indicated by arrow 508 and out the outlet port 28.

In the preferred embodiment the filtering material of the inner and outer filtering baskets 18 and 20 is a stainless steel woven mesh of size 100/42. The mesh size is specified in a form xx/yy where xx is the imperial mesh size (holes per inch) and yy is the approximate standard wire gauge of the wire forming the mesh.

In this embodiment both mesh screens are made of the same specification mesh, however in some instances differing mesh sizes may be advantageously used. The separation between the mesh layers of the first and second baskets 18 and 20 is 4 mm. Accordingly this embodiment may capture particles greater than 4 mm in length using the first capture mechanism discussed above, and may increase the capture of particles shorter than 4 mm by the second capture mechanism.

The measurements and mesh sizes discussed have been found to be optimal for use in removing elongate particles from a sample flow for an aspirated smoke detector such as the VESDA® LaserPLUS smoke detector produced by Xtralis Pty Limited. In other circumstances, such as with other detectors, or where the flow rate and/or particle size differs from the exemplary application, or even in applications where the fluid being filtered is not an air, the optimal screen size and spacing between screen portions will differ from those described above.

Figure 7A:
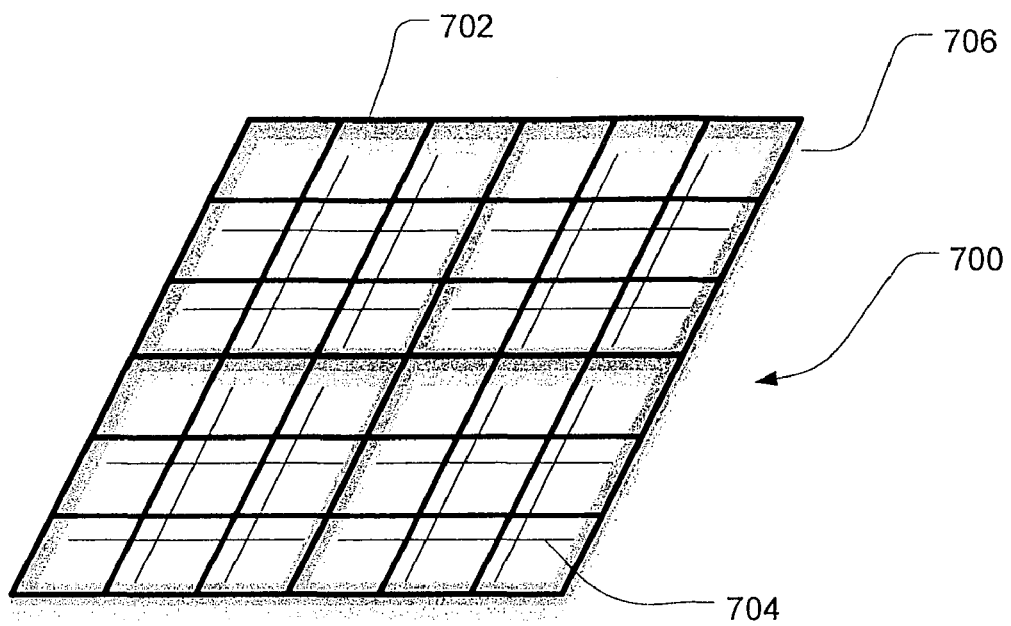
FIG. 7A shows a portion of a filter arrangement according to an embodiment of the present invention.
Figure 7B:
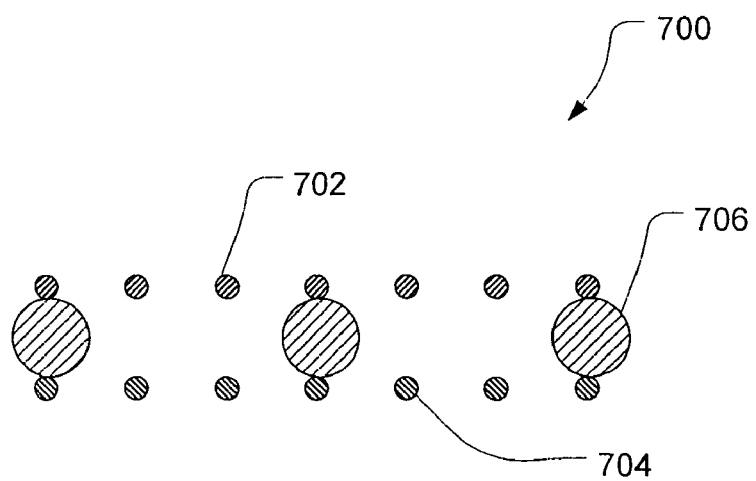
FIG. 7B is a cross section through the filter arrangement illustrated in FIG. 7A.

FIGS. 7A and 7B illustrate a portion of a filter arrangement of an embodiment of the present invention, which includes a three screen portions overlying each other. FIG. 7A illustrates a perspective view of the filter arrangement 700 and FIG. 7B shows a cross section through it. The filter arrangement 700 includes outer screen portions 702 and 704 having a relatively small hole size. Sandwiched between the outer layers 702 and 704 is spacer 706. The spacer 706 in this embodiment is a screen that has a hole size that is larger than the outer screen portions 702 and 704. In this embodiment, outer screen portions 702 and 704 are applied to opposite faces of the inner screen portion layer 706 and perform the primary filtering role of the filter arrangement 700. As can be seen in the cross sectional view of FIG. 7B the spacer 706 maintains a predetermined separation between the outer screen portions 702 and 704, and also provides a mechanical strength to the arrangement, whilst having a minimal effect on fluid flow through the filter arrangement.

In one embodiment the outer screen portions 702 and 704 are a wire mesh having a first set of dimensions. The inner screen portion 706 can also be a wire mesh that has dimensions which are chosen so as to maintain the separation between the outer screen portions 702 and 704. Alternatively the spacer 706 may be a made from other materials, e.g. it may be a moulded plastic screen.

Figure 8:
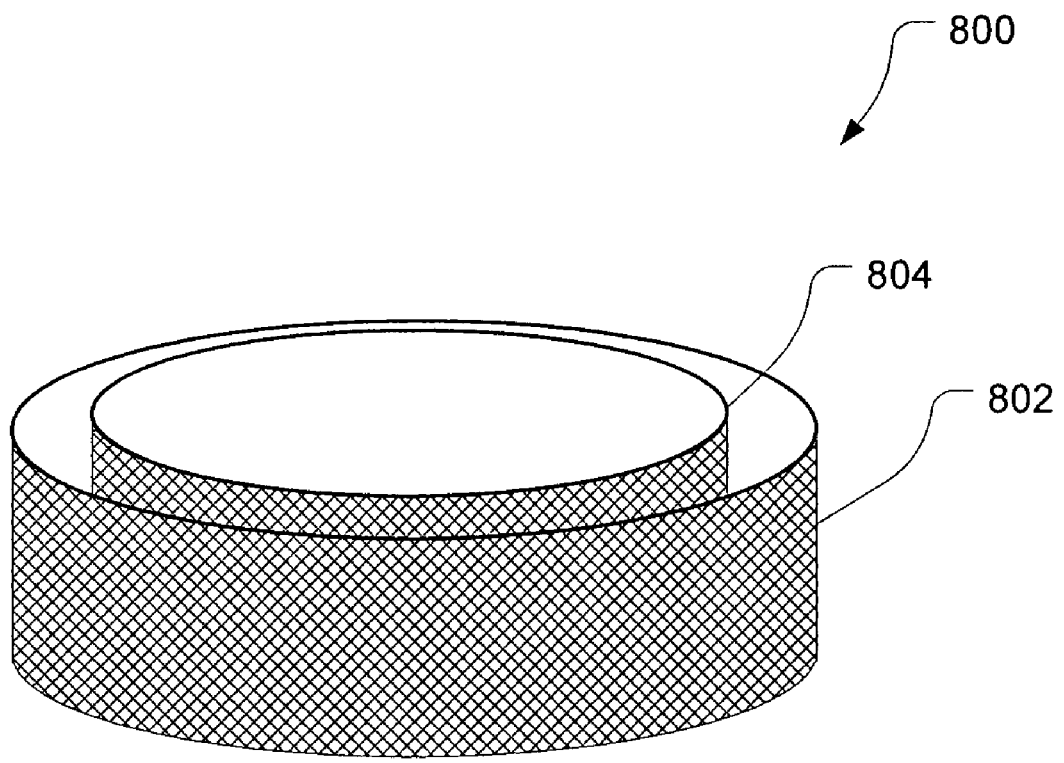
FIG. 8 illustrates another embodiment of a filter arrangement according to the present invention.

FIG. 8 shows an exemplary embodiment of a filter arrangement 800 having concentrically arranged cylindrical filter elements 802 and 804. Such an embodiment may be conveniently used in applications where a detector has an inlet (or plurality of inlets) through the side of a generally cylindrical portion of a housing, as is found in many point smoke detectors.

Furthermore the spacer need not be mesh-like in structure, but may comprise any spacer arrangement (including one that includes a plurality of separate spacers) that maintains a separation between the outer layers of screen and also allows flow to pass through the outer screen portions.

It should also be appreciated that more than two screen portions may be used in certain embodiments of the present invention to further reduce the number of particles passing through the filter arrangement. In this case, only two of the screen portions need to be positioned such that one is in the screen interaction region of the other. However, all (or some) of the screen portions downstream of the first may be located in the screen interaction region of one or more upstream screen portions.

In some instances the screen interaction effect noted above could be achieved using a single screen configured so as to have a screen portion that folds back over itself such that it overlies another portion of the screen, e.g. a screen with a U-shaped web of screen material, or tubular screen configuration mounted transversely to the fluid flow such that the fluid traverses the tube from one side to the other (e.g. diametrically for a cylindrical tube).

The holes in the screen portions can be of any suitable shape, and need not be uniform in shape, but may vary between screen portions, or within a screen portion.

It was also hypothesised that multiple layers of mesh would not suffer the same gradual degradation in smoke particle transmission as foam or other bulk filters; but rather that the flow rate would fall at the same time as the onset of reduction of smoke particle transmission, allowing the fault condition to be detected and reported in a timely manner before an unacceptable reduction of smoke detection capability occurs.

This "fail-safe" mechanism has been substantiated by experimentation.

It will be understood that the invention disclosed and defined in this specification extends to all alternative combinations of two or more of the individual features mentioned or evident from the text or drawings. All of these different combinations constitute various alternative aspects of the invention.

It will also be understood that the term "comprises" (or its grammatical variants) as used in this specification is equivalent to the term "includes" and should not be taken as excluding the presence of other elements or features.

The invention claimed is:

1. A filter arrangement for removing particles from a fluid to be processed by a particle detector, the particle detector being configured to define a critical particle length, the filter element having a plurality of overlying screen portions configured to be traversed in series by the fluid, wherein a first screen portion of the plurality of screen portions is spaced apart from a subsequently traversed screen portion by a predetermined distance, wherein the predetermined distance is not more than the critical particle length of the particle detector such that at least impurities having a length equal to or greater than the critical particle length are filtered from the fluid, and wherein the first screen portion of the plurality of screen portions is spaced apart from the subsequently traversed screen portion by a spacer means.

2. A particle detector including a filter arrangement for removing impurities from a fluid, the particle detector being configured to define a critical particle length, the filter arrangement including a plurality of screen portions through which the fluid passes, wherein the plurality of screen portions includes a first screen portion and a second screen portion separated from the first screen portion by a predetermined distance, wherein the predetermined distance is not more than the critical particle length of the particle detector such that at least impurities having a length equal to or greater than the critical particle length are filtered from the fluid, and wherein the first screen portion of the plurality of screen portions is spaced apart from a subsequently traversed screen portion by a spacer means.

3. A particle detection system including:
   a particle detector for detecting the presence of particles in a fluid flow, the particle detector being configured to define a critical particle length; and,
   a filter arrangement adapted to filter at least part of the fluid flow prior to the detection of particles by the particle detector, wherein the filter arrangement includes a plurality of screen portions through which the fluid passes, wherein the plurality of screen portions includes a first screen portion and a second screen portion separated from the first screen portion by a predetermined distance, wherein the predetermined distance is not more than the critical particle length of the particle detector such that at least impurities having a length equal to or greater than the critical particle length are filtered from the fluid and wherein the first screen portion of the plurality of screen portions is spaced apart from a subsequently traversed screen portion by a spacer means.

4. A filter arrangement for removing impurities from a fluid to be processed by a particle detector, the particle detector being configured to define a critical particle length, the filter arrangement including a plurality of screen portions through which the fluid passes, the plurality of screen portions including a first screen portion and a second screen portion separated from the first screen portion by a predetermined distance, wherein the predetermined distance is not more than the critical particle length of the particle detector such that at least impurities having a length equal to or greater than the critical particle length are filtered from the fluid.

5. A filter arrangement as claimed in claim 4 wherein the separation between screen portions is less than 90% of the critical particle length of the detector.

6. A filter arrangement as claimed in claim 4 wherein the separation between screen portions is between 80% and 50% of the critical particle length of the detector.

7. A filter arrangement as claimed in claim 4 wherein the critical particle length is between 0.25 mm and 10 mm.

8. A filter arrangement as claimed in claim 4 wherein the separation between the first screen portion and the second screen portion of the filter arrangement is optimised for operation at a fluid-flow flow rate of less than about 150 liters per minute.

9. A filter arrangement as claimed in claim 4, wherein the screen portions are formed from a mesh material.

10. A filter arrangement as claimed in claim 4, wherein the filter arrangement includes:
    a housing having at least one wall defining a chamber therein, said housing also having at least one inlet aperture through which fluid enters the chamber and at least one outlet aperture through which fluid exits the chamber;
    a plurality of filter elements displaced within the chamber, each filter element including at least one screen portion traversing the flow path from the inlet of the chamber to the outlet of the chamber.

11. A filter arrangement as claimed in claim 4 wherein, the first and second screen portions are formed of mesh material having substantially the same hole size.

12. A filter arrangement as claimed in claim 4, wherein the first and second screen portions are formed of mesh material having different hole sizes.

13. A filter arrangement as claimed in claim 4 wherein the screen portions are cylindrical in shape and arranged substantially concentrically with one another.

14. A filter arrangement as claimed in claim 4 wherein, the screen portions are different screens, arranged to be traversed by the fluid sequentially.

15. A filter arrangement as claimed in claim 14, wherein the first and second screen portions are substantially parallel.

16. A filter arrangement as claimed in claim 4 wherein, the filter arrangement includes spacer means positioned between the first and second screen portions.

17. A filter arrangement as claimed in claim 16 wherein the spacer means is configured to maintain at least a predetermined separation between the first and second screen portions.

18. A filter arrangement as claimed in claim 17 wherein the spacer includes a screen.

19. A filter arrangement as claimed in claim 18 wherein, the spacer means includes a mesh having a thickness equal to the predetermined separation between the first and second screen portions.

20. A filter arrangement as claimed in claim 17 wherein the spacer means includes one or more moulded elements.

21. A particle detector including a filter arrangement for removing impurities from a fluid, the particle detector being configured to define a critical particle length, the filter arrangement including a plurality of screen portions through which the fluid passes, wherein the plurality of screen portions includes a first screen portion and a second screen portion separated from the first screen portion by a predetermined distance, wherein the predetermined distance is not more than the critical particle length of the particle detector such that at least impurities having a length equal to or greater than the critical particle length are filtered from the fluid.

22. A particle detector as claimed in claim 21, wherein the screen portions are formed from a mesh material.

23. A particle detector as claimed in claim 21, wherein the filter arrangement includes:
a housing having at least one wall defining a chamber therein, said housing also having at least one inlet aperture through which fluid enters the chamber and at least one outlet aperture through which fluid exits the chamber;
a plurality of filter elements displaced within the chamber, each filter element including at least one screen portion traversing the flow path from the inlet of the chamber to the outlet of the chamber.

24. A particle detector as claimed in claim 21 wherein, the first and second screen portions are formed of mesh material having substantially the same hole size.

25. A particle detector as claimed in claim 21, wherein the first and second screen portions are formed of mesh material having different hole sizes.

26. A particle detector as claimed in claim 21 wherein the screen portions are cylindrical in shape and arranged substantially concentrically with one another.

27. A particle detector as claimed in claim 21 which is a smoke detector.

28. A particle detector as claimed in claim 21 wherein the separation between screen portions is less than 90% of the critical particle length of the detector.

29. A particle detector as claimed in claim 28 wherein the separation between screen portions is less than the critical particle length.

30. A particle detector as claimed in claim 21 wherein, the screen portions are different screens, arranged to be traversed by the fluid sequentially.

31. A particle detector as claimed in claim 30, wherein the first and second screen portions are substantially parallel.

32. A particle detector as claimed in claim 21, the particle detector further including:
an inlet configured to receive a fluid sample,
a housing including at least one wall defining a sample chamber in fluid communication with the inlet, the sample chamber being configured to receive at least part of the fluid sample;
particle detection means arranged to measure particles in a region of interest within the sample chamber, and where the filter arrangement is configured to remove impurities from the sample fluid entering the inlet.

33. A particle detector as claimed in claim 32 wherein the critical particle length is equal to the minimum distance between a wall defining at least part of the sample chamber and a region of interest of the particle detection means.

34. A particle detector as claimed in claim 21 wherein, the filter arrangement includes spacer means positioned between the first and second screen portions.

35. A particle detector as claimed in claim 34 wherein the spacer means is configured to maintain at least a predetermined separation between the first and second screen portions.

36. A particle detector as claimed in claim 35 wherein the spacer includes a screen.

37. A particle detector as claimed in claim 36 wherein, the spacer means includes a mesh having a thickness equal to the predetermined separation between the first and second screen portions.

38. A particle detector as claimed in claim 35 wherein the spacer means includes one or more moulded elements.

39. A particle detection system including:
a particle detector for detecting the presence of particles in a fluid flow, the particle detector being configured to define a critical particle length; and,
a filter arrangement adapted to filter at least part of the fluid flow prior to the detection of particles by the particle detector, wherein the filter arrangement is a plurality of screen portions through which the fluid passes, wherein the plurality of screen portions includes a first screen portion and a second screen portion separated from the first screen portion by a predetermined distance, wherein the predetermined distance is not more than the critical particle length of the particle detector such that at least impurities having a length equal to or greater than the critical particle length are filtered from the fluid.

40. A particle detection system as claimed in claim 39, wherein the screen portions are formed from a mesh material.

41. A particle detection system as claimed in claim 39, wherein the filter arrangement includes:
a housing having at least one wall defining a chamber therein, said housing also having at least one inlet aperture through which fluid enters the chamber and at least one outlet aperture through which fluid exits the chamber;
a plurality of filter elements displaced within the chamber, each filter element including at least one screen portion traversing the flow path from the inlet of the chamber to the outlet of the chamber.

42. A particle detection system as claimed in claim 39, wherein the first and second screen portions are formed of mesh material having different hole sizes.

43. A particle detection system as claimed in claim 39, wherein the separation between screen portions is less than 90% of the critical particle length of the detector.

44. A particle detection system as claimed in claim 43 wherein, the screen portions are different screens, arranged to be traversed by the fluid sequentially.

45. A particle detection system as claimed in claim 44, wherein the first and second screen portions are substantially parallel.

46. A particle detection system as claimed in claim 39 wherein the first and second screen portions are formed of mesh material having substantially the same hole size.

47. A particle detection system as claimed in claim 46 wherein, the filter arrangement includes spacer means positioned between the first and second screen portions.

48. A particle detection system as claimed in claim 47 wherein the spacer means is configured to maintain at least a predetermined separation between the first and second screen portions.

49. A filter arrangement as claimed in claim 48 wherein, the spacer means includes a mesh having a thickness equal to the predetermined separation between the first and second screen portions.

50. A filter arrangement as claimed in claim 47 wherein the spacer means includes one or more moulded elements.

51. A filter arrangement as claimed in claim 50 wherein the screen portions are cylindrical in shape and arranged substantially concentrically with one another.

52. A particle detection system as claimed in claim 48 wherein the spacer includes a screen.

* * * * *

UNITED STATES PATENT AND TRADEMARK OFFICE
CERTIFICATE OF CORRECTION

| | | |
|---|---|---|
| PATENT NO. | : 8,152,886 B2 | Page 1 of 2 |
| APPLICATION NO. | : 12/516178 | |
| DATED | : April 10, 2012 | |
| INVENTOR(S) | : Ron Knox | |

It is certified that error appears in the above-identified patent and that said Letters Patent is hereby corrected as shown below:

On Title page 2, item (56); under "Other Publications", in column 2, line 1, delete "PCT/AU207/0001805," and insert -- PCT/AU2007/0001805, --, therefor.

In column 1, line 2, below "FILTER ARRANGEMENT" insert

-- RELATED APPLICATIONS
This application is a national stage application under 35 U.S.C. 371 of PCT/AU2007/001805, filed November 23, 2007, and published as WO/2008/061317 on May 29, 2008, which claims priority under 35 U.S.C. 119 to Australian Application No. 2006906591, filed November 24, 2006, which applications and publication are incorporated herein by reference and made a part hereof in their entirety. --, therefor.

In column 2, line 16, delete "In this," and insert -- In this --, therefor.

In column 2, line 22, delete "that that" and insert -- that --, therefor.

In column 5, line 39, delete "108" and insert -- 108. --, therefor.

In column 6, line 4, delete "enters)." and insert -- enters) --, therefor.

In column 6, line 17, delete "then" and insert -- than --, therefor.

In column 10, line 31, in Claim 11, delete "wherein, the" and insert -- wherein the --, therefor.

In column 10, line 40, in Claim 14, delete "wherein, the" and insert -- wherein the --, therefor.

In column 10, line 45, in Claim 16, delete "wherein, the" and insert -- wherein the --, therefor.

In column 10, line 54, in Claim 19, delete "wherein, the" and insert -- wherein the --, therefor.

Signed and Sealed this
Third Day of July, 2012

David J. Kappos
*Director of the United States Patent and Trademark Office*

CERTIFICATE OF CORRECTION (continued)
U.S. Pat. No. 8,152,886 B2

In column 11, line 16, in Claim 24, delete "wherein, the" and insert -- wherein the --, therefor.

In column 11, line 34, In Claim 30, delete "wherein, the" and insert -- wherein the --, therefor.

In column 11, line 54, In Claim 34, delete "wherein, the" and insert -- wherein the --, therefor.

In column 11, line 63, In Claim 37, delete "wherein, the" and insert -- wherein the --, therefor.

In column 12, line 38, in Claim 44, delete "wherein, the" and insert -- wherein the --, therefor.

In column 12, line 47, in Claim 47, delete "wherein, the" and insert -- wherein the --, therefor.

In column 12, line 53, in Claim 49, delete "wherein, the" and insert -- wherein the --, therefor.